RECORDING APPARATUS

Filed Aug. 19, 1965

Inventors
George E. Stone,
Jack Allenby
by Sommers + Young
Attorneys

Inventors
George E. Stone,
Jack Allen by
by Sommers & Young
Attorneys

Inventors
George E. Stone,
Jack Allen by
by Sommers & Young
Attorneys

United States Patent Office 3,345,637
Patented Oct. 3, 1967

3,345,637
RECORDING APPARATUS
George Edward Stone, Darlington, and Jack Allenby, York, England, assignors to British Railways Board, London, England, a Public Authority
Filed Aug. 19, 1965, Ser. No. 481,134
5 Claims. (Cl. 346—33)

ABSTRACT OF THE DISCLOSURE

This invention seeks to provide recording apparatus which will accurately locate and record the peaks only of motions on each side of a fixed datum, especially the motions obtained by a recording trolley as a measure of railway-track conditions, thereby enabling visual inspection and counting of the peaks in a graphical record to be obviated.

This invention concerns improvements relating to recording apparatus. A particular object of the invention is to provide apparatus which will accurately locate and record the peaks only of a movement on each or either side of a fixed datum.

The invention is applicable with especial advantage to the evaluation of the recording motions obtained with the "Matisa" graphical track-recording trolley or machine and the provision of a numerical measure of railway-track condition.

The "Matisa" graphical track-recording trolley is disclosed in U.S. patent to Rouse No. 2,784,496.

Heretofore, the peaks of the graphical record traces on each side of a datum or mean line have been determined with the assistance of a transparent cursor, points being allocated for defects, for both number and severity, according to the positions of the peaks in relation to graduations at, say, $\frac{1}{10}$ inch intervals from the datum line. The physical counting of the peaks was tedious and exacting work and required considerable time. Due to the human element involved, material errors could arise. An object of the invention is to eliminate this possible source of error. However, the invention can obviously be applied to similar problems arising with other mechanical movements to be recorded, through electrical circuitry, by various kinds of recording means, such as visual or printing counters, solenoid-operated devices and the like.

According to the invention, peak-recording apparatus comprises a contact-carrying member connected to mechanism for transmitting to it a motion to be investigated and a shuttle-like member movable by and in relation to the said contact-carrying member and having contacts arranged to co-act with fixed contacts and with contacts of the former member in such a manner that contact conditions which produce a recording action will only be obtained when there is a change of direction of the motion transmitted to the former member. By the provision of a series of fixed contacts whose positions correspond to a range of different extents of motion on each side of a datum point, it is possible to record the extent of the motion as soon as there is a change in the direction thereof. Since the recording action is produced simply by change of direction of the motion, without regard to the position of the datum line, the apparatus will record successive peaks on one side of the datum line and directed either away from or towards the latter as readily as successive peaks on opposite sides of the line.

One embodiment of the invention by way of example will now be more fully described with reference to the accompanying drawings, in which.

Figure 5:
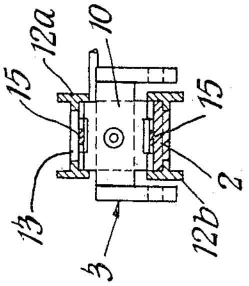
FIGURE 5 is an end view of the carriage.
Figure 4:
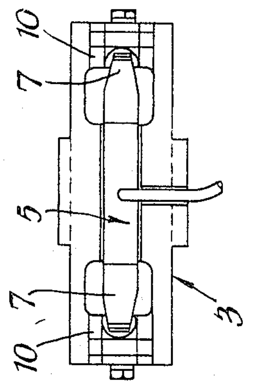
FIGURE 4 is a plan view of the carriage.
Figure 6:
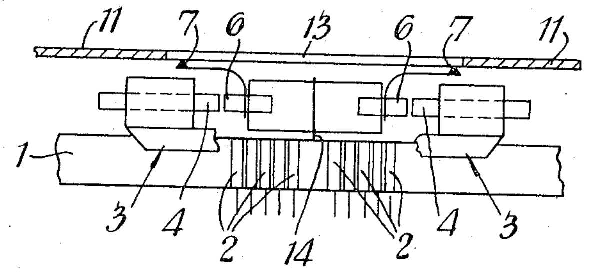
FIGURES 6–8 are diagrammatic front elevations showing the carriage in three different positions, FIGURE 7 also including a circuit diagram.

The embodiment illustrated is a recording head for a railway track-recording machine such as has been referred to above. The head consists essentially of three parts forming a unit, namely a fixed body 1 of insulating material having inset in it a line of transverse contact strips 2 in two series (FIGURES 2 and 6–8), one on each side of a mean datum point, a carriage 3 slidable in relation to the said body between upper and lower guides 12*a*, 12*b* (FIGURE 5) and having two opposed contacts 4, and a shuttle-like member 5 floatingly disposed within the carriage 3 between the contacts 4 and itself having end contacts 6 engageable electrically and mechanically by respective contacts 4. The shuttle mmeber 5 also has pick-up contacts 7 by each of which a circuit will be prepared, on motion of the carriage 3, to the end contact 6 which is not then engaged by the respective carriage contact 4, but which will be so engaged when the direction of the said motion is reversed.

Figure 3:
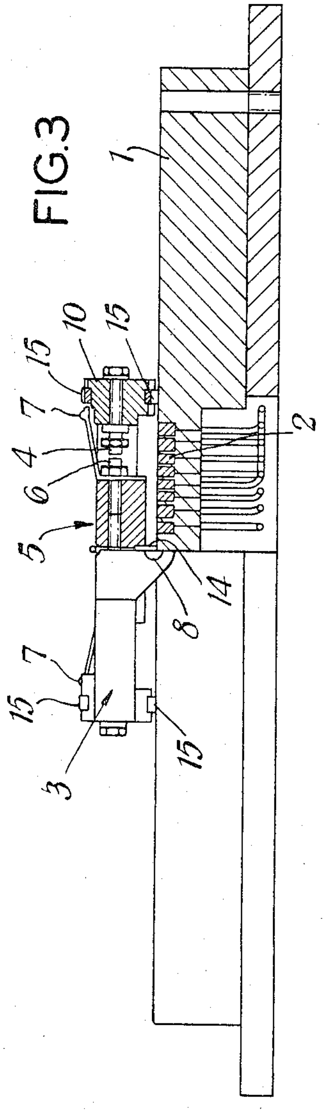
FIGURE 3 is a part longitudinal section, part elevation, of the body and carriage of the head.

The carriage, made of insulating material, is of box-shape, open at the top and bottom and is movable longitudinally of the body 1 over the contact strips 2 by trunnions 8 coupled through a forked link or yoke 9 to the pen actuating shaft (not shown) of the machine. As may be seen from FIGURE 3, each carriage contact 4 is mounted at the middle of an end wall 10 and projects into the interior of the box shape, in which the shuttle 5 is disposed with a slight freedom of movement between its contacts 6 and the carriage contacts 4. The pick-up contacts 7 consist of spring fingers extending upwardly and outwardly from the contacts 6 and engageable, in all but the mean position (FIGURE 6) of the carriage 5, with conductor sections 11 formed by or provided in the upper guide part 12*a*, where they are interrupted or separated by an insulating section 13. The sections 11 are permanently connected (FIGURE 7) to one side, as shown the positive side, of a source of supply of electricity. A silver-brush contact 14 provided on the underside of the shuttle at its mid-length is slidable over the line of contact strips 2. The carriage 3 slides by means of low friction pads 15.

The windings 16 of a number of high-speed relays *a–e* corresponding to the number of contact strips 2 in each of the series thereof are connected between the negative side of the source and corresponding strips 2 of each of the series. For the sake of simplicity, only five such strips 2 and five relays are shown in the diagrammatic FIGURES 6–8. Each relay controls two movable contacts 17, 18, one contact 17 for establishing a respective required recording or counting circuit (not shown) and the other contact 18 being movable between a position (shown for the relays *a* to *d*) in which the relay winding 16 can be energized by way of the shuttle contact 14 and a position (relay *e*) in which the winding, when energized, will be held energized, while the other relay windings 16 are latched out, until the existing connection at one end contact 6 of the shuttle is interrupted on a change of direction of the motion of the carriage 3. For this purpose, the said other contacts 18 are arranged to be closed in series, when the relays are not energised, between the carriage contacts 4 on the one hand and the shuttle contact 14 on the other hand. To permit freedom of movement, the connections to the carriage contacts 4 and shuttle contact 14 are made through flexible helical conductors 19.

Figure 7:
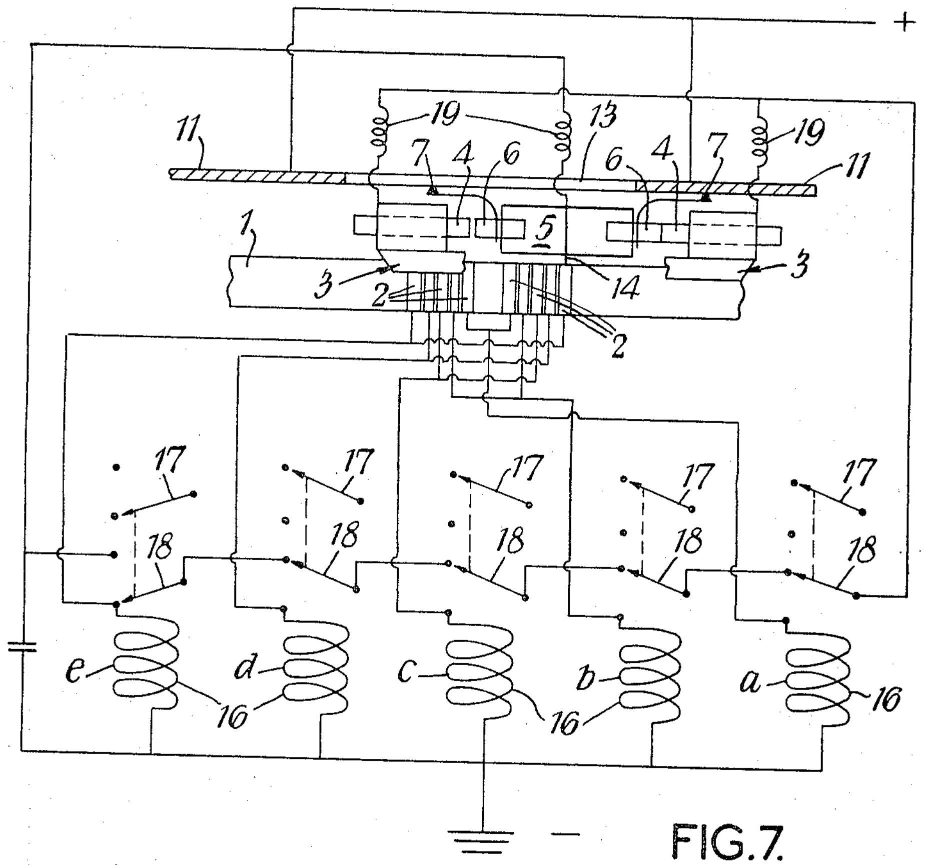

In the initial middle position (FIGURE 6) of the carriage 3, no current passes to the contacts 6 of the shuttle 5 because neither of its pick-up contacts 7 is in contact with the conductor sections 11. None of the relays *a* to *e* is energized. If the carriage 3 commences to move in one direction, say to the right, the left hand shuttle contact 6 will be engaged by the left-hand carriage contact 4, causing the shuttle 5 to be carried along with the carriage, as well as electrical contact to be made. No current will flow, however, because the left-hand pick-up contact 7 will still be out of contact with the adjacent conductor section 11. The right-hand pick-up contact 7 will make contact with the adjacent conductor section 11, but again no current will flow, in this case because the right-hand shuttle contact 6 is not in engagement with the co-acting carriage contact 4. Consequently, although the shuttle contact 14 will pass over one or more contact strips 2 of the right-hand series, depending upon the extent of the motion, no recording or counting action will yet result. In other words, simple motion from the datum point is not recorded. However, when there is a change in the direction of motion, that is when a peak is reached, then the hitherto open pair of contacts, 4, 6, in the example considered the right-hand pair, will be engaged, as shown in FIGURE 7, and a circuit will be established to the winding 16 of that relay to which the contact strip 2 reached by the contact 14 is connected. In the case of FIGURE 7, it is the relay *e* that is energised. The said relay operates and the peak will be recorded or counted by the closure of the contact 17 according to the extent of the motion. Closure of the contact 18 results in the relay *e* being held on and the other relays (*a–d*) being latched out because the shuttle contact 14 is no longer in circuit through the contact 18. The contact 14 could therefore pass over other contact strips 2 without effect. The energized relay *e* will, however, remain energised as long as the closed pair of contacts 4, 6 remains closed, that is until there is a change of direction of the motion or until the previously operative pick-up contact 7 moves on to the insulated section 13, whereupon the initial conditions will be restored.

Figure 8:
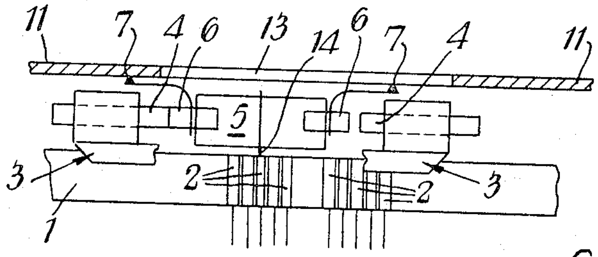

FIGURE 8 illustrates an opposite condition of the apparatus, in which the contacts 4, 6 on the left-hand side are in engagement.

In the embodiment of the invention described above, the motion is rectilinear and the contact strips are arranged transversely of a straight line. With a rotary or oscillatory motion, contact strips or segments may be disposed radially in a circular series.

Figure 1:
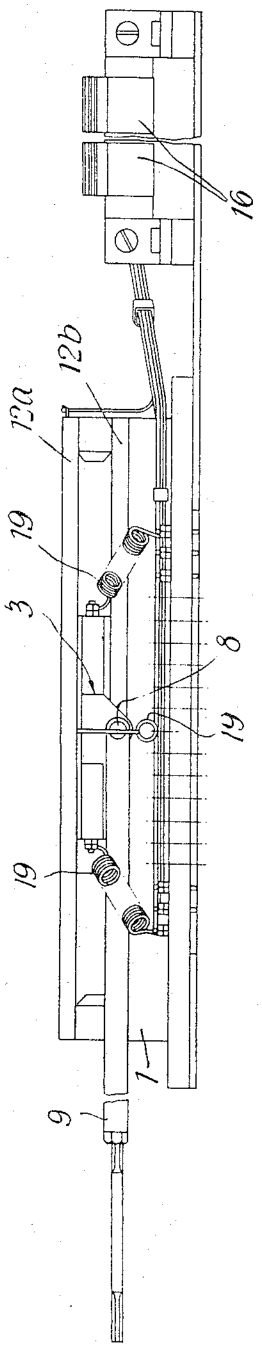
FIGURE 1 is a front elevation of a recording head.
Figure 2:
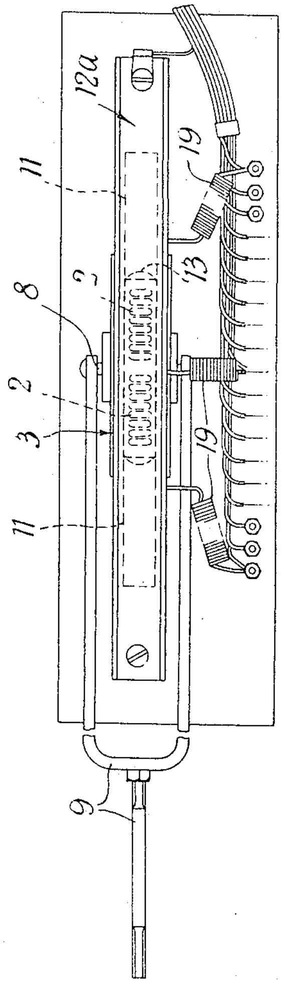
FIGURE 2 is a plan view thereof.

To apply the peak-recording apparatus of the present invention to the Matisa trolley shown in FIG. 2 of Patent No. 2,784,496, it would merely be necessary to connect the link or yoke 9 (shown in FIGS. 1 and 2 of the application) to the pin-actuating cable 39 of FIG. 2, of the patent in place of the pin 41 of the recording apparatus 42 of the latter.

We claim:

1. Apparatus for recording peaks of a motion to be investigated, comprising recording means, a contact-carrying member, a part connected to the said member for transmitting the said motion to the latter, and a shuttle-like member which is movable by and in relation to the said contact-carrying member and in relation to fixed contacts connected to the recording means and which has contacts arranged to co-act with the said fixed contacts and with contacts of the said contact-carrying member in such a manner that contact closure conditions which produce actuation of the recording means will only be obtained when there is a change of direction of the motion transmitted to the said contact-carrying member.

2. Peak-recording apparatus as claimed in claim 1, wherein the said fixed contacts include series of contacts, whose positions correspond to a range of different extents of motion, on each side of a datum or mean position.

3. Peak-recording apparatus as claimed in claim 1, wherein the fixed contacts include series of fixed contacts connected to the recording means and current-supplying contacts, and the contact-carrying member is a hollow rectilinearly movable carriage with contacts inside its ends, the shuttle-like member being located inside the carriage and having contacts at its ends for co-acting with the said contacts inside the carriage and contacts engageable with the said current-supply contacts only when the carriage and shuttle-like member are displaced in the one or other direction from a datum or mean position, the shuttle-like member being also provided with a contact slidable over the said series of contacts for initiating operation of the said recording means dependent upon the extent of the motion when there is a reversal of the direction of motion.

4. Peak-recording apparatus as claimed in claim 1, wherein the recording means comprises relays energised under the control of the contacts of the shuttle-like member.

5. Peak-recording apparatus as claimed in claim 1, wherein the recording means comprises relays energised under the control of the contacts of the shuttle-like member, the relays having each a contact for initiating a recording action dependent upon the extent of the motion when there is reversal of the direction and a contact for holding the relay energized and preventing the energisation of any other of the said relays until there is a further reversal of direction of motion.

References Cited

UNITED STATES PATENTS 3,118,057 1/1964 Sill et al. ............ 346—25

RICHARD B. WILKINSON, *Primary Examiner.*

M. LORCH, *Examiner.*